May 4, 1926.
J. R. JOHNSON ET AL
1,583,047
GEARING
Filed August 28, 1922    2 Sheets-Sheet 2
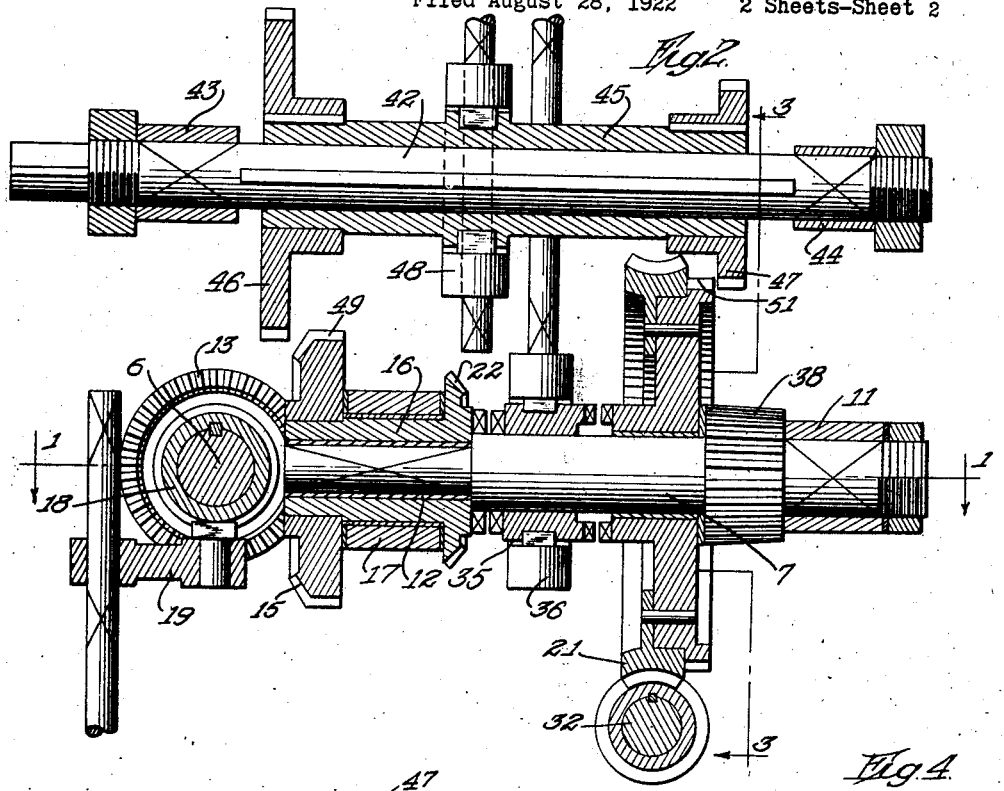
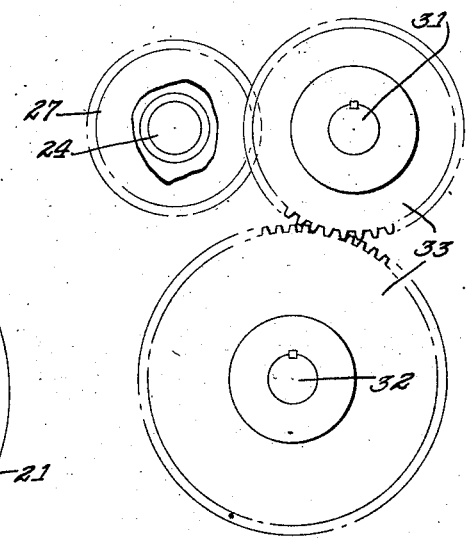
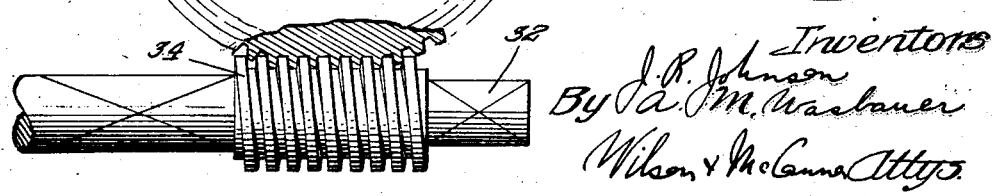

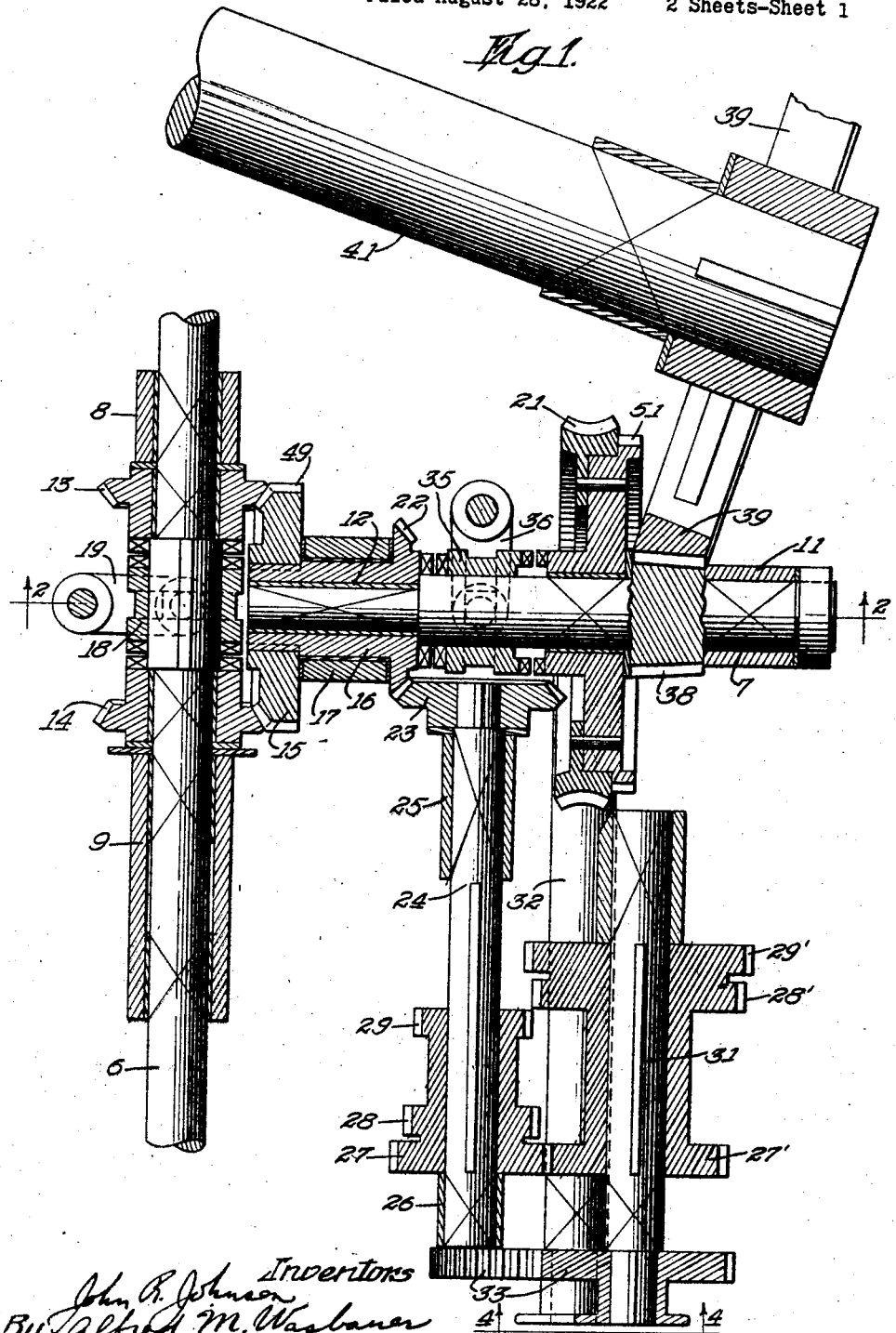

Patented May 4, 1926.

1,583,047

UNITED STATES PATENT OFFICE.

JOHN R. JOHNSON AND ALFRED M. WASBAUER, OF ROCKFORD, ILLINOIS, ASSIGNORS TO THE INGERSOLL MILLING MACHINE COMPANY, OF ROCKFORD, ILLINOIS, A CORPORATION OF ILLINOIS.

GEARING.

Application filed August 28, 1922. Serial No. 584,838.

*To all whom it may concern:*

Be it known that we, JOHN R. JOHNSON and ALFRED M. WASBAUER, citizens of the United States, residing at Rockford, in the county of Winnebago and State of Illinois, have invented certain new and useful Improvements in Gearing, of which the following is a specification.

This invention pertains in general to gearing; and its primary object is to provide a simplified and improved assembly of gears, clutches and shafting especially adapted for use in connection with machine tools and the like for transmitting from a driving shaft revolved at a uniform speed to a driven shaft, a relatively slow speed for feed purposes and a fast speed for rapid traverse, each in forward and reverse directions. It should be understood, however, that our invention is generally applicable as a power transmitting means and not limited to the particular use mentioned.

Another object is to provide an improved arrangement of gearing and clutches of the character described, including change speed gearing whereby the feed speeds may be varied, and to also provide for transmitting said feed and fast speeds to a second driven shaft independent of the first mentioned driven shaft.

Other objects and attendant advantages will be appreciated by those skilled in this art as the invention becomes better understood by reference to the following description when considered in connection with the accompanying drawings in which—

Figure 1 is a sectional view through an arrangement of gearing embodying our invention, taken on the line 1—1 of Fig. 2;

Fig. 2 is a sectional view taken on the line 2—2 of Fig. 1;

Fig. 3 is a sectional view taken on the line 3—3 of Fig. 2; and

Fig. 4 is an end view of the change speed gears, as seen from the line 4—4 of Fig. 1.

Referring more particularly to the drawings, it will be seen that the driving and driven shafts designated generally by 6 and 7, respectively, are co-planar and arranged at right angles to each other. These shafts may be suitably journaled, and in the present instance the shaft 6 is supported in bearings 8 and 9 and the shaft 7 in a bearing 11 and a bearing 12 in a part which will be presently described. It may be assumed that the driving shaft 6 will be continuously revolved in one direction at a uniform speed. It is desired to transmit this drive to the shaft 7 in forward and reverse directions and at a relatively fast and slow or feed speed in each direction. The means which we have provided to this end will now be described.

On the shaft 6, there is journaled a pair of opposed bevel gears 13 and 14 in mesh with an intermediate bevel gear 15 fixed to a sleeve 16 in which the shaft 7 is journaled and which may have bearing in a supporting part 17. A clutch element 18 splined on the shaft 6 is adapted to be shifted in opposite directions by a suitable shifter 19 for engaging its clutch teeth at either end with complemental clutch teeth on the adjacent gear 13 or 14 for establishing driving connection between said shaft and either of said gears. This provides a reversing mechanism whereby power from the driving shaft 6 may be transmitted to the part 16 in forward or reverse directions.

A worm gear 21 loose on the shaft 7 is adapted to be driven from the part 16 through the agency of gearing which will now be described. Said part 16 has fixed thereto a bevel gear 22 which meshes with a bevel gear 23 fixed to a shaft 24 journaled in suitable bearings 25 and 26. A cluster of gears 27, 28 and 29 splined on the shaft 24 is adapted to be shifted thereon to mesh any of its gears with the complemental gears 27', 28' or 29' keyed to a secondary shaft 31, whereby to transmit different speeds between the shafts 24 and 31. This shaft 31 drives a worm shaft 32 through the agency of pick-off gears 33 which are adapted to be removed for substitution of a new pair of gears of different ratio, whereby to increase the number of speed changes. The shaft 32 carries a worm 34 in mesh with the worm gear 21. It will be manifest from the foregoing that the worm gear 21 may be driven by the foregoing gearing either in a forward or a reverse direction at any of the three speeds provided by the change speed gears 27, 28 and 29, or at any further multiple of three speeds provided by changing the pick-off gears 33.

A clutch element 35 splined on the shaft 7 is adapted to be shifted by a shifting fork 36 to engage the teeth at its opposite ends with the complemental teeth of either the worm gear 21 or the gear 22 to thereby connect either of said gears directly to the shaft 7. By connecting the worm gear 21 to the driven shaft 7, a relatively slow powerful feed speed will be imparted to said shaft, such speed being especially desirable for feeding a machine tool into a work-piece, or for feeding a work-carriage to bring its work-piece into cutting relation to a tool. By shifting the clutch element 35 to connect the gear 22 that is, the sleeve 16, to the shaft 7, the latter will be driven at a relatively fast speed, such as desired for driving either the tools or work in a comparatively rapid movement. The feed and rapid traverse speeds may obviously be imparted either in forward or reverse directions according to the position of the clutch element 18.

In the present instance, the shaft 7 is equipped with a fixed bevel pinion 38 meshing with a bevel gear 39 fixed to a shaft 41, such as is used for feeding a heavy work-table back and forth on a bed, this particular arrangement being such as is employed in reciprocating type milling machines and simply illustrates one use of our invention.

Our invention also contemplates transmitting said feed and rapid traverse speeds to a second driven shaft independent of the first mentioned driven shaft, as shown in Fig. 2. The second driven shaft 42 journaled in bearings 43 and 44 directly above and parallel with the shaft 7, has splined thereon a sleeve 45, upon the opposite ends of which are fixed spur gears 46 and 47. This sleeve 45 is adapted to be shifted axially by means of a shifter yoke 48 for bringing its gears 46 and 47 into mesh respectively with the spur gears 49 and 51 formed integral with or fixed concentrically to the spur gear 15 and the worm gear 21. It will be evident that by this arrangement either the rapid traverse speeds or any of the feed speeds may be directly transmitted to the driven shaft 42 either independently of or in unison with the transmission of either or any of said speeds to the driven shaft 7. In the application referred to of our invention to milling machines, the driven shaft 42 may be employed for raising and lowering the cross rail which carries one or more spindle saddles and for transmitting any auxiliary feeds to said saddles or to the tool spindles. Our invention is also especially applicable to any knee-type milling machines and to any machine tool in which it is desired to impart rapid traverse and feed speeds to either one or two machine elements.

As a result of the foregoing, a very simple arrangement of gears and clutches is employed to transmit a variety of speeds to either one or two driven shafts, or to simultaneously drive said shafts at either the feed or rapid traverse speeds as the case may require. Our invention, however, is not limited to the use of two driven shafts or to the use of change speed gearing such as is provided by the gears 27, 28 and 29, but is characterized by a simple and practical co-ordination of the shafts 6 and 7 and of the parts directly operative therebetween for transmitting the feed and rapid traverse speeds either forward or reverse. In the event that said change speed gearing such as the cluster gears, is not used the shafts 24 and 32 will be directly connected by intermeshing gears on said shafts.

It is believed that the foregoing conveys a clear understanding of the objects prefaced above, and while we have illustrated but a single working embodiment, it should be understood that considerable change might be made in details of construction without departing from the spirit and scope of the invention as expresed in the appended claims.

We claim:

1. The combination of a driving shaft and a driven shaft in co-planar and right angle relation, a reversing connection between the driving shaft and a rapid traverse part loose on the driven shaft, a worm gear loose on said driven shaft and driven by said rapid traverse part, and a clutch for connecting either said worm gear or said rapid traverse part to the driven shaft.

2. The combination of a driving and a driven shaft in co-planar right angle relation, a reversing connection between the driving shaft and a rapid traverse part loose on the driven shaft, a feed gear loose on the driven shaft and driven by reduction gearing from said rapid traverse part, and clutch means for connecting either said rapid traverse part or said feed gear to the driven shaft.

3. The combination of a driving and a driven shaft in co-planar right angle relation, a rapid traverse part loose on the driven shaft, means for driving said part in either forward or reverse direction from the driving shaft revolving in a single direction, a feed part loose on the driven shaft, means for driving the feed part from the rapid traverse part at a reduced speed, and means for connecting either said feed or said rapid traverse part to the driven shaft.

4. The combination of a driving shaft and a driven shaft, co-planar and at right angles, a pair of opposed bevel gears loose on the driving shaft and in mesh with an intermediate bevel gear loose on the driven shaft, a clutch for connecting the driving shaft to either of the gears thereon, a worm gear loose on the driven shaft, a worm in mesh with said worm gear, a driving connection between said worm and the bevel gear on the driven shaft, and a clutch for connecting either said worm gear or said bevel gear to the driven shaft.

5. The combination of a driving shaft and a driven shaft, co-planar and at right angles, a pair of opposed bevel gears loose on the driving shaft and in mesh with an intermediate bevel gear loose on the driven shaft, a clutch for connecting the driving shaft to either of the gears thereon, a worm gear loose on the driven shaft, a worm in mesh with said worm gear, a driving connection between said worm and the bevel gear on the driven shaft, including change-speed gearing, and a clutch for connecting either said worm gear or said bevel gear to the driven shaft.

6. The combination of a driving shaft and a driven shaft, co-planar and at right angles, a pair of opposed bevel gears loose on the driving shaft and in mesh with an intermediate bevel gear loose on the driven shaft, a clutch for connecting the driving shaft to either of the gears thereon, a worm gear loose on the driven shaft, a worm in mesh with said worm gear, a driving connection between said worm and the bevel gear on the driven shaft, a clutch for connecting either said worm gear or said bevel gear to the driven shaft, said bevel gear and worm gear on the driven shaft each having a spur gear fixed concentric therewith, a second driven shaft parallel with the first mentioned driven shaft, and spur gears on the second driven shaft adapted to be moved into and out of mesh with said spur gears on the first mentioned driven shaft.

7. The combination of a driving shaft and a driven shaft in co-planar right angle relation, opposed bevel gears loose on the driving shaft and in mesh with an intermediate bevel gear loose on the driven shaft, a clutch element splined on the driving shaft and adapted to connect either of said opposed bevel gears thereto, a bevel gear co-axial and fixed to said bevel gear on the driven shaft and in mesh with a bevel gear fixed to a cluster-gear shaft, a cluster of different diameter gears on the last mentioned shaft, a cluster of gears complemental to the first mentioned cluster, one of said clusters of gears adapted to be shifted with respect to the other to mesh with the respective gears for effecting changes in speed, a worm gear loose on the driven shaft, a worm meshing with said worm gear and fixed to a worm shaft, a driving connection between said worm shaft and the second mentioned cluster of gears, whereby said worm gear is adapted to be driven at different speeds forward and reverse, and a clutch element splined on the driven shaft for connecting thereto either said worm gear or the bevel gear on the driven shaft.

8. Gearing of the character described comprising a driving and reversing device, a first and a second driven shaft, a rapid traverse and a feed gear loose on the first driver shaft and driven by said device, means for connecting either said rapid traverse or feed gear to the first driven shaft, and gearing operable directly between said rapid traverse and feed gears respectively and the second driven shaft for driving the latter at rapid traverse and feed speeds.

9. Gearing of the character described comprising driving and reversing gearing, a first and a second driven shaft, the former of which is concentric with and driven by the driven gear of said reversing gearing, a rapid traverse and a feed gear loose on the first driven shaft and driven by said driven gear of the reversing gearing, means for connecting either said rapid traverse or feed gear to the first driven shaft, and gearing operable directly between said rapid traverse and feed gears and the second driven shaft for driving the latter at rapid traverse and feed speeds.

10. Gearing of the character described comprising a first and a second shaft, a rapid traverse driving gear loose on the first shaft, a feed gear loose on said first shaft and driven by the rapid traverse gear through means of change speed gearing, a spur gear fixed to each of said rapid traverse and feed gears, and gears on the second shaft adapted to mesh with said spur gears.

11. The combination of a first and a second shaft in parallel relation, a driving shaft co-planar with and at right angles to the first shaft, a reversing connection between said driving shaft and the first shaft, a rapid traverse and a feed gear loose on the first shaft and driven by said reversing connection, means for connecting either of said gears to said first shaft, and gears splined on the second shaft and shiftable into and out of mesh with said rapid traverse and feed gears.

12. Gearing of the character described comprising a driving and a driven shaft at right angles, opposed bevel gears loose on the driving shaft and in mesh with an intermediate bevel gear, a clutch element for connecting either of the opposed gears to the driving shaft, a rapid traverse gear and a feed gear loose on the driven shaft and each driven by said intermediate gear, and a clutch for connecting either of said rapid traverse or feed gears to the driven shaft.

13. Gearing of the character described comprising a driving and a driven shaft at right angles, a rapid traverse gear and a feed gear loose on the driven shaft, a clutch for connecting either of said gears to the driven shaft, and a reversing clutch on the driving shaft connected with said rapid traverse and feed gears for simultaneously driving them.

14. Gearing of the character described comprising a driving and a driven shaft at right angles, a rapid traverse gear and a feed gear loose on the driven shaft, a clutch for connecting either of said gears to the driven shaft, opposed bevel gears loose on the driving shaft and in mesh with an intermediate bevel gear, a clutch for connecting either of said opposed gears to the driving shaft, and means including change speed gears for simultaneously driving said rapid traverse and feed gears from said intermediate gear.

15. The combination of a driving shaft, a pair of opposed gears loose thereon, an intermediate gear in mesh with said opposed gears, a clutch element for connecting either of said opposed gears to the driving shaft, a driven shaft concentric with said intermediate gear, a worm gear loose on said driven shaft, a worm driven by said intermediate gear for driving said worm gear, and a clutch element on said driven shaft for connecting it to either said intermediate or worm gear.

16. In combination, a prime drive shaft, a reversing device driven thereby the driven element of which is adapted for transmitting rapid traverse motion in either direction, a driven shaft concentric with said rapid traverse element, a feed element loose on the driven shaft, means for connecting either said rapid traverse or said feed element to the driven shaft, and means driven by said rapid traverse element for driving said feed element including a change speed device.

17. In combination, a prime drive shaft, a reversing device driven thereby the driven element of which is adapted for transmitting rapid traverse motion in either direction, a driven shaft concentric with said rapid traverse element, a feed element loose on the driven shaft, means for connecting either said rapid traverse or said feed element to the driven shaft, and means driven by said rapid traverse element for driving said feed element, a second driven shaft, a rapid traverse and a feed element on the second driven shaft, and means for selectively establishing a driving connection between the second driven shaft and either the rapid traverse or feed element on the first mentioned driven shaft.

18. In combination, a prime driven shaft, a rapid traverse element driven thereby, a driven shaft concentric with the rapid traverse element, a feed element loose on the driven shaft, means for selectively connecting either the rapid traverse element or the feed element to the driven shaft, and means driven by the rapid traverse element for driving the feed element including a change speed device.

19. In combination, a prime drive shaft, a reversing device driven thereby including a rapid traverse gear, a feed-transmitting worm gear coaxial with said rapid traverse gear, a driven shaft, means for selectively connecting either said rapid traverse or worm gear to the driven shaft, a worm shaft having a worm meshing with said worm gear, a shaft parallel with the worm shaft and in driving connection with the rapid traverse gear, and change speed gearing operable between said parallel shafts.

JOHN R. JOHNSON.
ALFRED M. WASBAUER.